United States Patent [19]
Girard

[11] Patent Number: 4,938,058
[45] Date of Patent: Jul. 3, 1990

[54] ELECTRICAL FLECHETTE SPIN RIG FOR WIND TUNNEL TESTING

[75] Inventor: Bertrand Girard, Sillery, Canada

[73] Assignee: Her Majesty the Queen in right of Canada, as represented by the Minister of National Defence, Ottawa, Canada

[21] Appl. No.: 413,767

[22] Filed: Sep. 28, 1989

[30] Foreign Application Priority Data

Oct. 14, 1988 [CA] Canada .................................. 580548

[51] Int. Cl.$^5$ .............................................. G01M 9/00
[52] U.S. Cl. ................................................. 73/147
[58] Field of Search ...................................... 73/147

[56] References Cited

U.S. PATENT DOCUMENTS 4,773,262  9/1988  Girard .................................. 73/147

Primary Examiner—Donald O. Woodiel
Attorney, Agent, or Firm—William R. Hinds

[57] ABSTRACT

A sting for supporting and spinning small diameter models in a wind tunnel consistsing of a rear section securable within a standard wind tunnel, a cone shaped region at the front end of the rear section and a small diameter, model supporting, front section upon which a balance and a model can be mounted; an electric motor within the rear section aligned along the string axis; a drive gear mounted on the motor shaft; a driven shaft parallel to the motor shaft and extending from the motor to the cone shaped region, a driven pinion at the rear end of the driven shaft in meshing contact with the drive gear, a drive pinion at the front end of the drive shaft, a driving sleeve on the front section having a driving gear secured to its rear end and in engagement with the drive pinion, and a pair of spigots at the front end of the driving sleeve for contacting a model to be tested.

5 Claims, 2 Drawing Sheets

ELECTRICAL FLECHETTE SPIN RIG FOR WIND TUNNEL TESTING

BRIEF SUMMARY OF THE INVENTION

This invention relates to a spin rig for spinning a model in a wind tunnel.

BACKGROUND OF THE INVENTION

In order to measure, within a wind tunnel, various aerodynamic coefficients of spinning projectiles such as flechettes, instrumented spinning models have to be used in conjunction with a six degrees of freedom strain gauge type sting balance.

Unlike spin-stabilized projectiles where the spin motion is forced against the airflow by inertia forces, and where the spin rate is slowly damped by aerodynamic forces, flechette projectiles have their spin motion induced and stabilized by aerodynamic forces on their fins.

Consequently, when undertaking wind tunnel tests, the spin motion of a spin stabilized projectile (without fins) has to be transmitted by mechanical means to the model and the spin motion of a flechette projectile model must be left free so that spinning can occur at a natural spin rate in order to reproduce flow around the fins and obtain reliable data.

This condition does not cause any particular problem when a blow-down wind tunnel is used, because of the high level of dynamic pressures involved. At the beginning of a wind tunnel run, the model can freely accelerate to spin while leaving long enough time to perform measurements.

However when using an indraft wind tunnel, where the available dynamic pressure may be 30 times less than with a blow-down wind tunnel, the air flow build up time to accelerate the model up to spinning speed is insufficient.

In such a case, the model is accelerated to the correct spin rate level before a wind tunnel run, by a mechanical means which is disengaged just before the measurements are made. The delay between disengaging the mechanical means and taking the measurements is required to allow the spin rate to stabilize naturally.

This invention is related to an electrical spin rig which is particularly suitable for accelerating flechette models to the desired spin rate before a test run is made particularly but not exclusively in an indraft wind tunnel.

There is no way known in the prior art to test in an indraft wind tunnel, very small spinning models of flechette type projectiles which are for instance normally less than 0.75 inches in diameter.

In the case of much larger model sizes which are possibly more than 2 inches in diameter, an air turbine is used to spin the models. The present state of the art system consists of an air turbine and gear reduction situated within a conical part of the sting together with a mechanism to engage or disengage the air turbine at will so that the model can spin freely.

The only known facility of this type is at NASA, and it has a very large spin rig used for finned rocket models of about 10-in. in diameter and 9 feet in length. No publications on this item are known.

The only known disclosure in this field is found in the article "Spin Force Testing of High Finness Ration Configurations" by J. M. Cooksey, Manager, Wind Tunnel Laboratories, Oct. 2nd, 1986, LTV Aerospace and Defence Company, Vought Missiles and Advanced Programs Divisions, Dallas, Tex. This publication discloses a spin rig for smooth (no fins) models of high length to diameter ratios (about 30). The drive motor which is an air turbine would not be powerful enough to spin a model fitted with fins. The turbine is not contained inside the model but is integral with the sting at the model base thereof and can be disengaged at will. The model is about 2 inches in diameter and 5 feet long. It is not possible to utilize this spin rig with a model having a diameter less than this 2 inches especially when fitted with fins as it is not possible to obtain the power to be able to spin such a finned model.

The present state of the art using an air turbine to spin a wind tunnel flechette model is not easily applicable to model size of about 0.75 inch in diameter and the associated sting size.

Because of the intrinsic physics of air turbines, the necessary power (about 1100 watts) would impose very high revolutions to the turbine (more than 120,000 RPM) which leads to complicated technology like oil mist lubrication, overspeeding bearings and problems associated with compressed air between the gear teeth. The resulting mechanism would therefore be very fragile and prone to damage.

Turbine exhaust air ports would also have to be proportionally very large (2 in$^2$.) and would lead to a weak sting support from a structural point of view. This is undesirable because of the high length/diameter ratio of a typical flechette model that requires a strong support sting which will not flex due to the large pitching moments encountered.

It is also difficult to incorporate an air turbine into a servo system, whereas a D.C. electric motor can be controlled so that the torque polarity can be momentarily reversed to slow down the spin rate during servo feedback control.

SUMMARY OF THE INVENTION

In the past five years small and powerful electric D.C. motors have been developed that use a cobalt type of permanent magnet stator of high coercive force.

The high power to volume ratio of these small D.C. motors has led to their consideration as good candidates for use in small spin rigs used with flechette type wind tunnel models, which can be fitted with tabs or canted fins.

The purpose of the spin rig is essentially to accelerate a flechette model to the desired spin rate prior to the air indraft in the test section of the wind tunnel, and attain a stabilized spin rate during the ten second time when flow stabilizes and measurements are done. This is necessary because of the low dynamic pressure intrinsic to indraft wind tunnels.

The main advantage is to allow the spinning of very small flechette type models and be able to test them in indraft wind tunnels that have small cross-sectional area test sections.

Since flechette type models have a high length over diameter ratio, the model diameter is determined and restricted by the maximum model length allowable in a test section when the model is swept at an angle of attack. If it were too long, the nose cone of the model would make contact with the test section ceiling. This situation would result in unacceptable physical interferences between the ceiling or roof and the test model. It is also undesirable to have the nose cone approach the ceiling of the test section too closely as there will then be aerodynamic interferences.

The spin rig of this invention is electrically driven and is very compact. The following items can be fitted in an interchangeable flechette type model having an outer shell diameter of 0.75 inches:
1. A 6 Degress of Freedom strain gauge balance.
2. A cobalt permanent magnet type electric D.C. motor which can develop 1100 watts for a time of 30 seconds.
3. A gear ration (preferably 1:1) to transmit the spinning motion for the drive motor inside the sting to the model outside the sting.
4. Optical fibers can be used for spin-rate monitoring of the model and of the motor separately and provide spin-rate feedback information to the excitation controller.
5. An actuator can be used in conjunction with a linear feedback system to engage or disengage the driving sleeve during a test run in order to accelerate the model to a preset spin rate.

While the driving sleeve is engage at the beginning or partly engaged at the end of a test run, it absorbs starting and stopping overloads thus protecting the balance from being damaged.

BRIEF DESCRIPTION OF THE DRAWINGS

A preferred embodiment of the invention will now be described with reference to the attached drawings in which.

DETAILED DESCRIPTION OF AN EMBODIMENT OF THE INVENTION

Figure 1:
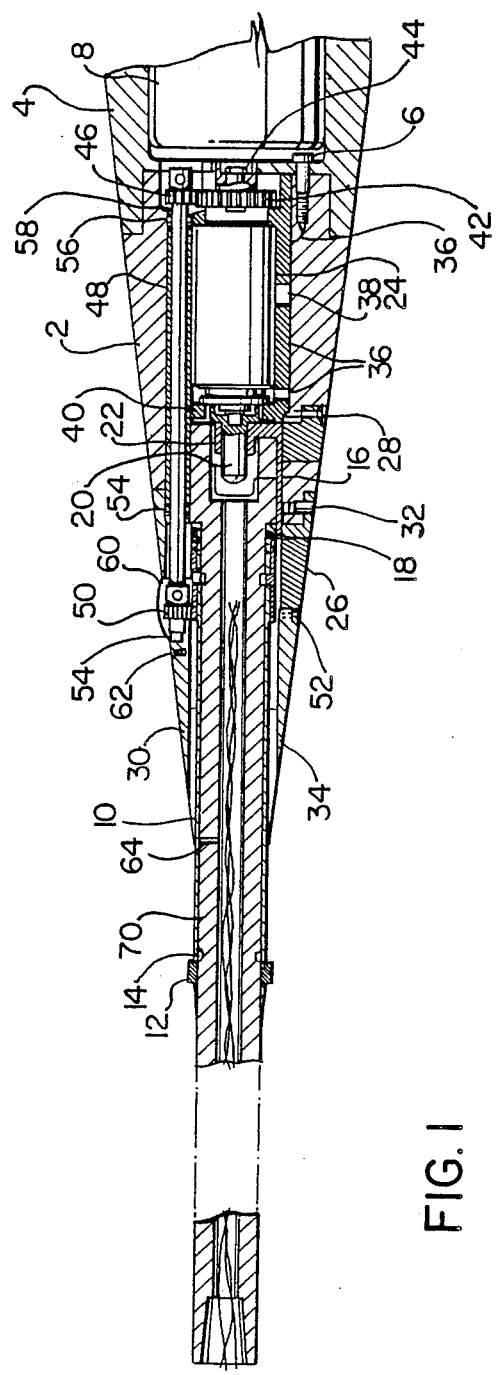
FIG. 1 is a cross-section elevational view of an embodiment of flechette spin rig according to this invention.
Figure 2:
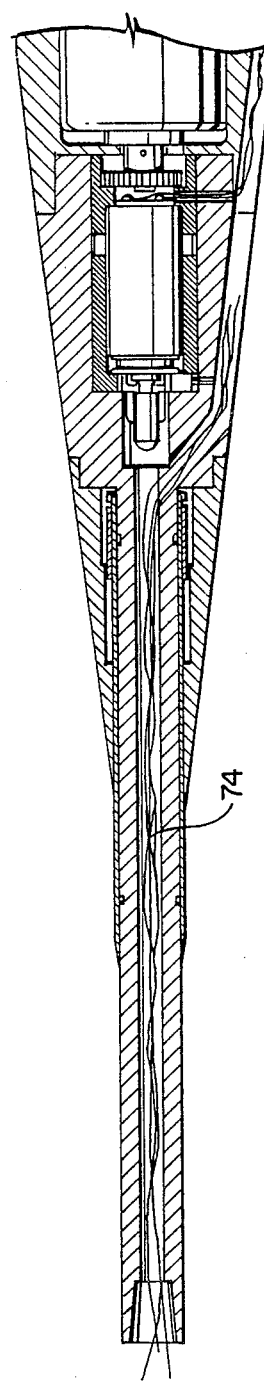
FIG. 2 is an underneath plan view of the flechette spin rig of FIG. 1.

Referring specifically to FIGS. 1 and 2, the sting consists of a sting support cone 2 which is held to a drive motor housing 4 by a ring of assembly bolts 6. The sting mount (not shown) is screwed inside the drive motor housing 4 and holds the drive motor 8 in place.

The driving sleeve 10 which is over the sting, has two driving spigots 12 supported by split bushings 14. The driving sleeve 10 can slide backwards or forwards in order to engage or disengage the model base. The motion is produced by the action of a push/pull actuator 16 that engages an aft end groove on the driving sleeve 10. This groove is fitted with two split flange bearings 18 to minimize the friction with the actuator 16.

Movement of the push/pull actuator 16 is produced by rotation of an actuator worm 20 which drives a threaded bushing 22 which is part of the actuator 16. The worm 20 is rotatably driven by actuator motor 24 which is preferably a relatively small 24 volt D.C., 3 watts electrical motor with an internal gear train having a ratio of 45:1.

The push/pull arm of the actuator 16 is held radially by two fingers 26 which are held in place by four holding bolts 28.

The front end sting support cone 30 is held to the sting support cone 2 by seven front support cone holding bolts 32.

Two assembly slots 34 inside the front end of the sting support cone 30 permit sliding the support cone 30 over the driving sleeve 10 and providing clearance for the driving spigots 12 when assembling the parts.

The actuator motor 24 is held inside the sting support cone 2 by the actuator motor housing 36 and a spacer 38. A photoelectric angular position detector 40 used in conjunction with the actuator worm 20 and appropriate electronic equipment, permits the positioning of the driving sleeve 10 at three different positions which are:
a—full back (disengaged)
b—mid (partly engaged), with no contact between the driving spigots 11, and
c—full forward (engaged), with contact between driving spigots 20 and the flechette.

Spinning motion is transmitted by the spin drive motor 8 to the driving sleeve 10 by a drive gear 42 which is held onto the motor shaft by lock screws 44, and a pinion 46 meshing with the drive wheel 42, a shaft 48 and a second pinion 50 that engages a driving sleeve gear 52 secured to the driving sleeve 10.

The drive motor 8 is a powerful D.C. electric motor that uses a cobalt type permanent magnet stator of high coercive force. The rotor has 11 poles and can develop 1100 watts for a period of 30 seconds.

The pinions and shaft assembly are supported by bearings 54 and 56 and extra shaft bearings at in-between points. These in-between bearings are held in position by spaced bushings and retaining ring 58.

The pinion 50 is protected by a gear cover 60 held by a countersunk headed bolt 62.

The model spin rate is monitored by optical fibers positioned in two ports 64 which are used in conjunction with electronic sensors (not shown) and a spin drive motor excitation controller (not shown).

Figure 3:
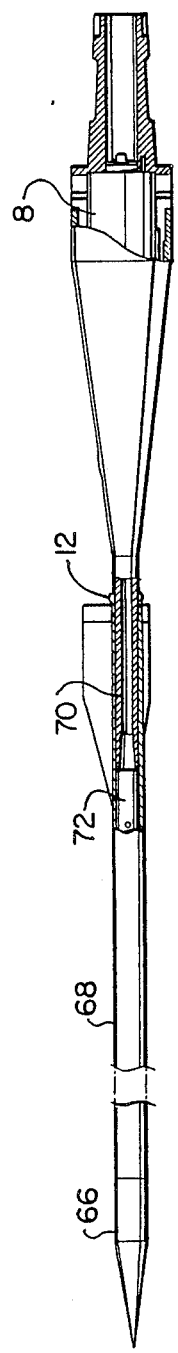
FIG. 3 is a partially cross-sectioned elevational view of the flechette spin rig as shown in FIG. 1 with a flechette installed upon it.

Referring also to FIG. 3, there is shown a flechette model having a nose cone 66 second to a flechette body 68 secured to sting support 70 through a strain gauge balance 72. The flechette is spun by spigots 12. The electrical wiring 74 form the balance is accommodated along the inner bore of the sting support and is led along a channel, together with the wires from the optical fiber detectors and the two motors and other sensors along a groove through the cone 2 and back to the control panel (not shown).

It will thus be seen that there has been disclosed an apparatus by which it is possible to spin very small diameter flechette models in a wind tunnel, this being particularly useful within draft type facilities having low dynamic pressure.

There has also been disclosed an apparatus which enhances spin control precision since an electrical D.C. motor is easier to monitor than a turbine.

The power supply to the electrical motor is also more readily available and is easier to feed through electrical wires into the sting than is compressed air which must be fed through piping. The use of an electrical motor as the spin driving motor will also result in a construction cost of about one third of that of a similar but larger flechette spinning rig which uses a compressed air turbine to achieve the spinning.

The invention is limited only by the claims which follow.

I claim:

1. A sting for supporting and spinning small diameter models in a wind tunnel consisting of a rear section securable within a standard wind tunnel, a cone shaped region at the front end of the rear section and a small diameter, model supporting, front section upon which a balance and a model can be mounted; an electric motor within the rear section aligned along the sting axis; a drive gear mounted on the motor shaft; a driven shaft parallel to the motor shaft and extending from the motor to the cone shaped region, a driven pinion at the rear end of the driven shaft in meshing contact with the drive gear, a drive pinion at the front end of the drive shaft, a driving sleeve on the front section having a driving gear secured to its rear end and in engagement with the drive pinion, and a pair of spigots at the front end of the driving sleeve for contacting a model to be tested.

2. The sting of claim 1, including an actuator which can selectively position the drive sleeve between an engaged forward position with a model being tested and a disengaged rearward position.

3. The sting of claim 2, wherein the actuator includes a threaded bushing rotatably secured to the rear end of the drive sleeve, an actuator worm within the bushings, and a gearhead motor within the cone shaped region having an output to which the worm is secured.

4. The sting of claim 3, wherein a photoelectric position detector is situated adjacent to the threaded bushing to monitor the position of the actuator.

5. The sting of claim 1, wherein the electric motor is of the cobalt permanent magnet stator type which delivers a high coercive force.

* * * * *